(12) United States Patent
Ben-Ezra et al.

(10) Patent No.: US 9,571,313 B2
(45) Date of Patent: Feb. 14, 2017

(54) FULL-OPTICAL MULTIWAVELET ORTHOGONAL FREQUENCY DIVISIONAL MULTIPLEXING (OFDM) AND DEMULTIPLEXING

(71) Applicant: Mer-CellO Wireless Solutions LTD., Petach-Tikva (IL)

(72) Inventors: Yossef Ben-Ezra, Rehovot (IL); Yaniv Ben Haim, Kfar-Mordechai (IL)

(73) Assignee: Mer-Cello Wireless Solutions Ltd., Petach Tikva (IL)

( * ) Notice: Subject to any disclaimer, the term of this patent is extended or adjusted under 35 U.S.C. 154(b) by 92 days.

(21) Appl. No.: 14/606,045

(22) Filed: Jan. 27, 2015

(65) Prior Publication Data

US 2016/0080180 A1    Mar. 17, 2016

Related U.S. Application Data

(60) Provisional application No. 62/049,459, filed on Sep. 12, 2014.

(51) Int. Cl.
*H04J 11/00* (2006.01)
*H04L 27/00* (2006.01)
(Continued)

(52) U.S. Cl.
CPC ............ *H04L 27/0004* (2013.01); *H04J 11/00* (2013.01); *H04J 14/02* (2013.01); *H04L 27/265* (2013.01); *H04L 27/2628* (2013.01)

(58) Field of Classification Search
CPC ...... H03M 1/121; G02F 1/225; H04B 10/676; H04L 7/0075
(Continued)

(56) References Cited

U.S. PATENT DOCUMENTS 5,959,967 A * 9/1999 Humphrey .......... H04L 27/0004
                                                  370/203
6,265,999 B1 * 7/2001 Prucnal ................. H04L 7/0075
                                                  341/137
(Continued)

OTHER PUBLICATIONS

Ezra et al "All-optical wavelet-based orthogonal frequency division multiplexed system based on silicon photonic ingetrated components" Apr. 2016, The Institution of Engineering and Technology, vol. 10, Issue 2, pp. 44-50.*
(Continued)

*Primary Examiner* — David Payne
*Assistant Examiner* — Tanya Motsinger
(74) *Attorney, Agent, or Firm* — Nathan & Associates Patent Agents Ltd.; Menachem Nathan

(57) ABSTRACT

Aspects of embodiments relate to an optical wavelet transform (WT) or inverse wavelet transform (IWT) medium for implementing optical multiwavelet orthogonal Frequency Division Multiplexing (OFDM) or optical demultiplexing. In embodiments, the optical WT/IWT medium comprises a plurality of N waveguides for receiving in parallel a corresponding number of N modulated optical input signals $\lambda_{1,MOD}$ to $\lambda_{N,MOD}$. Each waveguide comprises at least two optical resonators configured such to realize a wavelet filterbank so that the modulated optical signals $\lambda_{1,MOD}$ to $\lambda_{n,MOD}$ undergo WT/IWT in a manner such to obtain optical wavelet transformed signals that can be orthogonally frequency division multiplexed or demultiplexed.

18 Claims, 8 Drawing Sheets

(51) Int. Cl.
  *H04J 14/02* (2006.01)
  *H04L 27/26* (2006.01)
(58) Field of Classification Search
  USPC .................................................. 398/43, 76
  See application file for complete search history.

(56) References Cited

U.S. PATENT DOCUMENTS

| | | | | |
|---|---|---|---|---|
| 7,133,456 | B2* | 11/2006 | Feher | H04B 7/0602 375/259 |
| 7,609,611 | B1* | 10/2009 | Siohan | H04J 4/005 370/208 |
| 7,912,377 | B2* | 3/2011 | Koga | H04B 10/1141 398/17 |
| 8,026,837 | B1* | 9/2011 | Valley | H04B 10/676 341/137 |
| 8,902,096 | B2* | 12/2014 | Valley | H03M 1/12 341/137 |
| 8,923,702 | B2* | 12/2014 | Wan | H04B 1/28 398/115 |
| 8,971,701 | B2* | 3/2015 | Adles | H04B 10/616 398/155 |
| 2003/0156014 | A1* | 8/2003 | Kodama | H04B 3/54 375/258 |
| 2004/0120564 | A1 | 6/2004 | Gines | |
| 2005/0031048 | A1* | 2/2005 | Koga | H04L 27/0004 375/260 |
| 2005/0156775 | A1* | 7/2005 | Petre | H03M 1/121 341/155 |
| 2007/0071124 | A1* | 3/2007 | Kodama | H04B 3/54 375/260 |
| 2007/0171402 | A1* | 7/2007 | Watley | E21B 47/102 356/73.1 |
| 2009/0110033 | A1* | 4/2009 | Shattil | H04B 1/7174 375/141 |
| 2009/0202243 | A1* | 8/2009 | Qian | H04B 10/61 398/65 |
| 2010/0201345 | A1* | 8/2010 | Gupta | G02F 7/00 324/96 |
| 2010/0220376 | A1* | 9/2010 | Kobayashi | G02F 1/0327 359/238 |
| 2011/0176815 | A1* | 7/2011 | Frankel | H04B 10/5053 398/184 |
| 2012/0045160 | A1* | 2/2012 | Sekiya | H04B 10/0775 385/1 |
| 2012/0229886 | A1* | 9/2012 | Chen | H04B 10/506 359/326 |
| 2014/0036964 | A1* | 2/2014 | Asahina | H04J 13/0077 375/141 |
| 2014/0099053 | A1* | 4/2014 | Sato | G02F 1/0123 385/3 |
| 2014/0245596 | A1* | 9/2014 | Whitaker | A61B 8/00 29/594 |
| 2014/0266826 | A1* | 9/2014 | Valley | H03M 1/12 341/137 |
| 2014/0355926 | A1* | 12/2014 | Velthaus | G02F 1/2255 385/3 |
| 2015/0207567 | A1* | 7/2015 | Bogoni | H04B 10/90 398/115 |
| 2015/0249496 | A1* | 9/2015 | Muijs | H04B 10/116 398/118 |
| 2015/0382237 | A1* | 12/2015 | Kim | H04J 11/00 370/210 |

OTHER PUBLICATIONS

Li et al, "Wavelet Packet Transform-Based OFDM for Optical Communications", Dec. 15, 2010, Journal of Llghtwave Technology, vol. 28, No. 24, pp. 3519-3528.*

Cincotti et al, "Optical Wavelet Signals Processing and Multiplexing", EURASIP Journal of Applied Signal Processign 2005:10 pp. 1574-1583.*

Dawood et al. "Comparison of Perfromance of OFDM based on Multiwavelet Transfrom with Different Modulation Schemes", Sep. 4, 2014, 2014 IEEE 2014 International Conference of Computer, Communication , and Control Technology, (14CT 2014), pp. 403-405.*

Ezra, Y. B., Zadok, A., Lembrikov, B. I., Brodeski, D., & Halifa, R. (2012).All-optical signal processing for high spectral efficiency (SE) optical communication. INTECH Open Access Publisher, pp. 343-366.*

Ezra et al "All-optical wavelet-based orthogonal frequency division multiplexed system based on silicon photonic ingetrated components" Apr. 2016, The Insitution of Engineering and Technology, vol. 10. Issue 2, pp. 44-50.*

Ömer Bulakci et al; "Wavelet Transform Based Optical OFDM" Conference on Optical Fiber Communication, pp. 1-3, Mar. 22-26, 2009.

PCT/IB2015/050606 Search Report of the international search authority, Jul. 2015.

* cited by examiner

FULL-OPTICAL MULTIWAVELET ORTHOGONAL FREQUENCY DIVISIONAL MULTIPLEXING (OFDM) AND DEMULTIPLEXING

CROSS REFERENCE TO RELATED APPLICATIONS

This application is related to and claims priority from U.S. Provisional Patent Application No. 62/049,459 having the same title and filed Sep. 12, 2014, which is incorporated herein by reference in its entirety.

FIELD

Embodiments of various systems disclosed herein relate in general to Optical Frequency Division Multiplexing (OFDM) and, more particularly, to optical OFDM.

BACKGROUND

Optical Frequency Division Multiplexing (OFDM) is known as a modulation technique that allows efficient multiplexing i.e., combining of analogue or digital signals, transmission of the combined signals over a shared medium, and respective assigning of the combined signals to a multiplicity of users. Fast Fourier Transformation (FFT) are tools used ubiquitously in signal processing and signal analysis applications, including in OFDM. In recent years, the Discrete Wavelet Transform (DFT) is increasingly used to replace FFT in implementing OFDM, as the use of wavelet-based transforms overcomes some of the disadvantages associated with FFT-based OFDM, for example the creation of side lobes due to the use of rectangular windows.

Known multiwavelet-transform (MWT) or multiwavelet-based OFDM (MWT-OFDM) techniques are implemented by employing full-electronic or electro-optical techniques, both of which however require electronic signal processing. As known in the art, optical signal processing is much faster than electronic signal processing. Hence, the electronic processing in (for example) electro-optical techniques is sometimes referred to as "the electronic bottleneck". Full-optical realizations of wavelet transforms are limited to the use of scalar wavelet transforms.

There is therefore a need for, and it would be advantageous to have an architecture that enables multiwavelet-based OFDM and, correspondingly, multiwavelet-based demultiplexing techniques that are implemented fully optically.

The description above is presented as a general overview of related art in this field and should not be construed as an admission that any of the information it contains constitutes prior art against the present patent application.

SUMMARY

Aspects of embodiments relate to a device, system and method for full-optical OFDM.

According to some embodiments, an optical multiwavelet transform (MWT) medium or an inverse multiwavelet transform (IMWT) medium for implementing optical wavelet transform (WT) Orthogonal Frequency Division Multiplexing (OFDM) or optical demultiplexing, respectively, comprises a plurality of N waveguides for receiving in parallel N corresponding modulated optical input signals $\lambda_{1,MOD}$ to $\lambda_{N,MOD}$. Each waveguide includes at least two optical resonators configured such as to realize a wavelet filterbank that effects a wavelet transformation or inverse wavelet transformation (IWT) on the modulated optical signals to obtain optical WT or IWT signals that can be orthogonally frequency division multiplexed or demultiplexed, respectively.

According to some embodiments, an optical resonator of the at least two optical resonators includes a microring resonator.

According to some embodiments, an optical resonator of the at least two optical resonators includes a Mach-Zehnder interferometer.

According to some embodiments an optical resonator of the at least two optical resonators includes a plurality of microring resonators in cascade arrangement.

According to some embodiments, the wavelet filterbank is a Geronimo, Hardian and Massopust (GHM) wavelet filterbank.

According to some embodiments, an optical wavelet multiplexer comprises a multiplexer input module comprising a plurality of N modulators for modulating N optical input signals to obtain a plurality of N modulated optical input signals $\lambda_{1,MOD}$-$\lambda_{N,MOD}$, and the optical MWT medium for receiving the N modulated optical input signals $\lambda_{1,MOD}$-$\lambda_{N,MOD}$.

According to some embodiments the multiplexer input module includes a light source.

According to some embodiments, the multiplexer input module includes a splitter for splitting optical signals emitted by the light source.

According to some embodiments, the optical wavelet multiplexer includes a multiplexer feedback module configured to cause adjustment of physical parameters of one or more of the at least two optical multiplexer resonators based on detected signal parameters at an output signal line.

According to some embodiments, an optical wavelet demultiplexer comprises an optical IMWT medium that includes a plurality of N waveguides for receiving in parallel corresponding N modulated optical WT input signals $\lambda_{1,MOD,WT}$ to $\lambda_{N,MOD,WT}$ of an optical OFDM signal. Each waveguide includes at least two optical resonators configured such to realize a wavelet filterbank that effects inverse wavelet transformation (IWT) on the modulated optical wavelet transformed signals to obtain optical IWT signals $\lambda_{1,MOD,IWT}$ to $\lambda_{N,MOD,IWT}$ that can be demultiplexed.

According to some embodiments, the optical wavelet demultiplexer comprises a demultiplexer input module for providing the optical IMWT medium with the plurality of N modulated and wavelet transformed optical signals $\lambda_{1,MOD,WT}$ to $\lambda_{N,MOD,WT}$ of a multiplexed signal $I_{mux}$.

According to some embodiments, the optical wavelet demultiplexer comprises a demultiplexer output module for providing demultiplexed signals $I_{1,demux}$ to $I_{N,demux}$ over output signal lines. According to some embodiments, the optical wavelet demultiplexer includes a demultiplexer feedback module that is operatively coupled with one or more of the at least two optical demultiplexer resonators and with the output signal lines and/or with each output of the demultiplexer waveguides.

According to some embodiments, the demultiplexer output module further comprises N optical filters for obtaining optical inverse wavelet transformed signals $\lambda_{c0,1,MOD,IWT}$ to $\lambda_{cQ,N,MOD,IWT}$ respective of their carrier wavelengths $c_0$ to $c_Q$.

According to some embodiments, a system comprises an optical wavelet multiplexer as above for multiplexing source signals $I_{1,source}$ to $I_{N,source}$ and an optical wavelet demultiplexer as above, the optical wavelet demultiplexer communicably coupled with the optical wavelet multiplexer for recreating the sources signals $I_{1,source}$ to $I_{N,source}$.

According to some embodiments, the optical multiplexer resonators are employed to implement optical demultiplexer resonators with respective different inputs and outputs for multiplexed and demultiplexed optical signals.

According to some embodiments, a method for optical multiwavelet OFDM or optical multiwavelet demultiplexing of a plurality of optical signals comprises receiving a plurality of N modulated optical signals $X_{1,MOD}$ to $X_{n,MOD}$ at a respective plurality of N waveguides of an optical MWT or IMWT medium, each waveguide comprising at least two optical resonators. The method further comprises transmitting the plurality of N signals through the N waveguides for generating a plurality of wavelet transformed or inverse wavelet transformed optical signals $\lambda_{1,MOD,WT/IWT}$ to $\lambda_{N,MOD,WT/IWT}$ according to coupling coefficients of the at least two optical resonators This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Embodiments disclosed herein are described, by way of example only, with reference to the following accompanying drawings, wherein.

DETAILED DESCRIPTION

Aspects of embodiments relate to a system, device and method that allow optical multiwavelet OFDM and, analogously, optical demultiplexing of multiwavelet OFDM signals. The multiplexing and/or demultiplexing may in some embodiments be performed fully optically, i.e., free of optical-to-electrical signal conversion or vice versa.

According to some embodiments, an optical wavelet or multiwavelet Optical Frequency Division (OFD) multiplexer and OFD demultiplexer comprises an optical optical wavelet transform (WT) medium that includes a plurality of waveguides. Each of the plurality of waveguides includes at least two optical (multiplexer and/or demultiplexer) resonators for the concurrent transmission and wavelet-based filtering of a respective plurality of n modulated optical signals $\lambda_{n,MOD}$, where n≥1.

It should be noted that exemplarily in some embodiments, each of the plurality of optical signals $\lambda_{2,MOD}$-$\lambda_{n,MOD}$ may undergo different modulation, while in some other embodiments two or more carrier signals may undergo identical modulation.

As outlined hereinbelow in more detail, the optical resonators of the plurality of waveguides are configured such as to obtain coupling coefficients to effect multiwavelet multiplexing or demultiplexing with respect to the plurality of modulated optical signals. More specifically, coupling coefficients obtained by the optical microring resonators may correspond to coefficients of a multiwavelet (MW) matrix filterbank such as, for example, the filterbank proposed by Geronimo, Hardian and Massopust, also known as "GHM filter matrix" or "GHM filterbank". In a multiwavelet setting exemplified herein, multiscaling and multiwavelet function coefficients may be 2×2 matrices which, during a transformation step, multiply vectors instead of scalars. This means that the filterbank needs two input rows.

The plurality of modulated optical signals may for example originate from an unmodulated optical carrier wave that is split by a splitter of the system into N unmodulated optical carrier waves. The N unmodulated optical carrier waves may then each be modulated by an external modulator to obtain the modulated optical signals.

It is noted that while embodiments disclosed herein refer in general to optical signals only, this should by no means to be constnied as limiting as, in some embodiments, electronic signal processing may also be involved. For example, an electronic signal representing a carrier wave may be split electronically into a plurality of electronic signals representing respective carrier waves, which may then be converted into a plurality of optical carrier waves.

Figure 1:
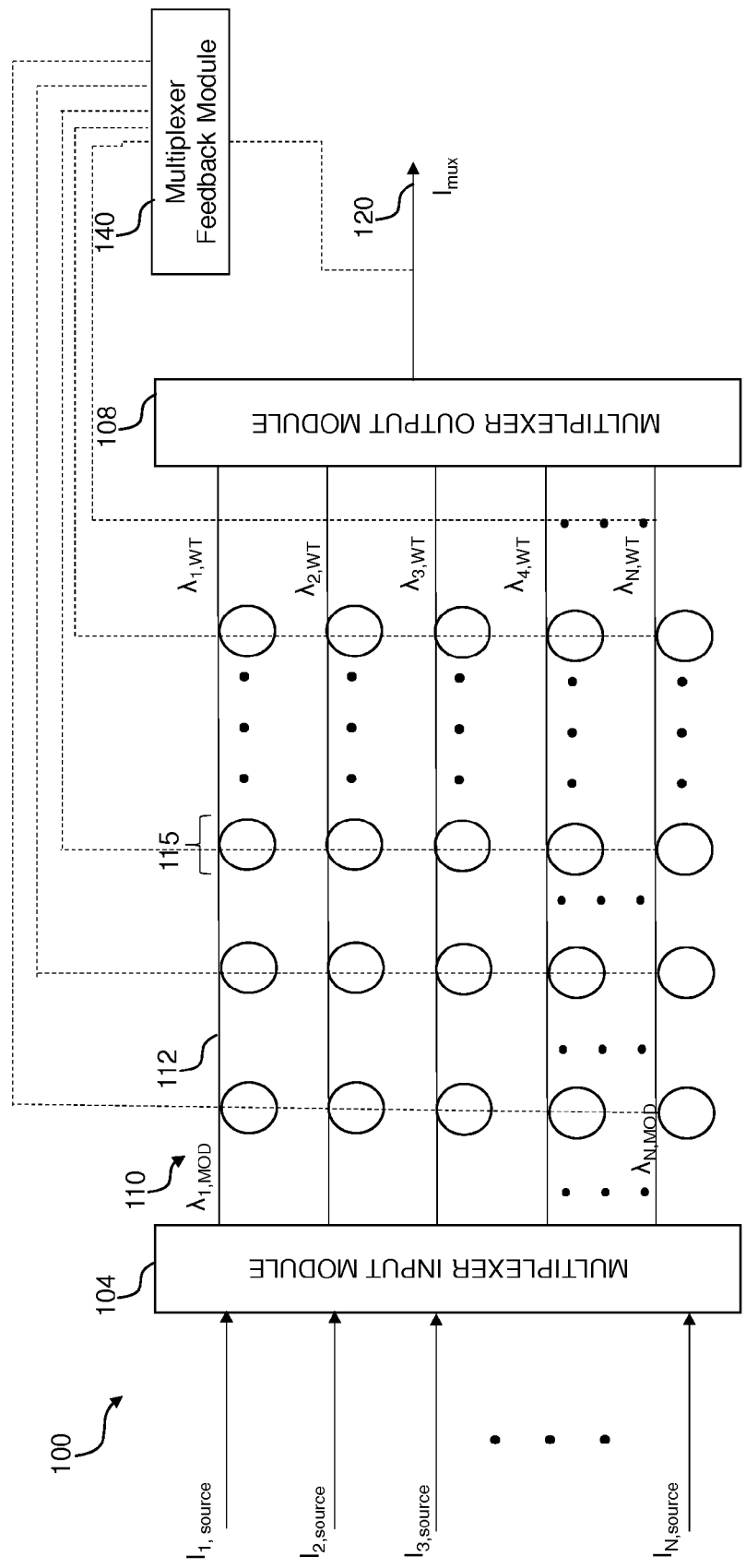
FIG. 1 is a schematic general block-diagram illustration of an optical multiwavelet OFDM multiplexer, according to an embodiment.

Referring to FIG. 1, aspects of embodiments relate to an optical wavelet multiplexer 100. Optical wavelet multiplexer 100 includes an optical MWT multiplexer medium 110 and may further include a multiplexer input module 104 and a multiplexer output module 108. Optical MWT multiplexer medium 110 includes a plurality of multiplexer waveguides 112 that are communicatively coupled in parallel with multiplexer output module 108. The number of multiplexer waveguides 112 may correspond to the number of input signals $I_{1,source}$ to $I_{n,source}$.

Multiplexer waveguides 112 include at least two optical multiplexer resonators 114 configured to realize a MW filterbank for optical multiwavelet OFDM such that modulated optical signals $\lambda_{1,MOD}$ to $\lambda_{n,MOD}$ received from multiplexer input module 104 by optical MWT multiplexer medium 110 are wavelet-processed over the optical MWT multiplexer medium 110 by the plurality of multiplexer waveguides 112. The plurality of wavelet-processed optical signals is then multiplexed by multiplexer output module 108 to obtain a multiplexed output signal $I_{mux}$. As outlined hereinbelow in greater detail, $I_{mux}$ can be an electrical signal or an optical signal representative of wavelet processed optical signals.

The MW filterbank is realized by the plurality of multiplexer waveguides 112 and optical multiplexer resonators 114. Examples disclosed herein relate to the realization of a GHM filterbank. However, this should by no means to be construed as limiting. Accordingly, optical MWT multiplexer medium 110 may be configured to implement other MW filterbanks such that optical wavelet multiplexer 100 enables optical multiwavelet-transform and orthogonal multiplexing of modulated optical signals $\lambda_{1,MOD}$ to $\lambda_{n,MOD}$.

The number of optical multiplexer resonators 114 may be $n^2$, where n is the number of optical input signals. The MW filterbank may for example be expressed by the following mathematical equation:

$$W = \begin{bmatrix} H_0 & H_1 & H_2 & H_3 & 0 & 0 & \ldots & 0 & 0 & 0 & 0 \\ 0 & 0 & H_0 & H_1 & H_2 & H_3 & \ldots & 0 & 0 & 0 & 0 \\ \vdots & \vdots & \vdots & \vdots & \vdots & \vdots & \ldots & \vdots & \vdots & \vdots & \vdots \\ H_2 & H_3 & 0 & 0 & 0 & 0 & \ldots & 0 & 0 & H_0 & H_1 \\ G_0 & G_1 & G_2 & G_3 & 0 & 0 & \ldots & 0 & 0 & 0 & 0 \\ 0 & 0 & G_0 & G_1 & G_2 & G_3 & \ldots & 0 & 0 & 0 & 0 \\ \vdots & \vdots & \vdots & \vdots & \vdots & \vdots & \ldots & \vdots & \vdots & \vdots & \vdots \\ 0 & 0 & 0 & 0 & 0 & 0 & \ldots & G_0 & G_1 & G_2 & G_3 \\ G_2 & G_3 & 0 & 0 & 0 & 0 & \ldots & 0 & 0 & G_0 & G_1 \end{bmatrix} \quad (1)$$

where $H_0$, $H_1$, $H_2$ and $H_3$ are high-pass filter matrices and $G_0$, $G_1$, $G_2$ and $G_3$ are low-pass filter matrices. In general, matrices $H_0$ and $G_0$ may be referred to as "taps" that are $K \times K$ matrices. Merely to simplify the discussion that follows, K may equal 2, the taps are implemented by $2 \times 2$ matrices. Accordingly, an incoming data stream carried by modulated optical signals may undergo serial-to-parallel conversion.

The matrix elements of $H_0$, $H_1$, $H_2$ and $H_3$ may for example take the following values:

$$H_0 = \begin{bmatrix} \frac{3}{5\sqrt{2}} & \frac{4}{5} \\ -\frac{1}{20} & -\frac{3}{10\sqrt{2}} \end{bmatrix}; H_1 = \begin{bmatrix} \frac{3}{5\sqrt{2}} & 0 \\ \frac{9}{20} & \frac{1}{\sqrt{2}} \end{bmatrix}; \quad (2)$$

$$H_2 = \begin{bmatrix} 0 & 0 \\ \frac{9}{20} & -\frac{3}{10\sqrt{2}} \end{bmatrix}; H_3 = \begin{bmatrix} 0 & 0 \\ -\frac{1}{20} & 0 \end{bmatrix}$$

The matrix elements of $G_0$, $G_1$, $G_2$ and $G_3$ may for example take the following values:

$$G_0 = \begin{bmatrix} -\frac{1}{\sqrt{20}} & -\frac{3}{\sqrt{20}} \\ \frac{1}{10\sqrt{2}} & \frac{3}{10} \end{bmatrix}; G_1 = \begin{bmatrix} \frac{9}{20} & -\frac{1}{\sqrt{2}} \\ \frac{9}{10\sqrt{2}} & 0 \end{bmatrix}; \quad (3)$$

$$G_2 = \begin{bmatrix} \frac{9}{20} & -\frac{10}{10\sqrt{2}} \\ \frac{9}{10\sqrt{2}} & -\frac{3}{10} \end{bmatrix}; G_3 = \begin{bmatrix} -\frac{1}{10} & 0 \\ -\frac{1}{10\sqrt{2}} & 0 \end{bmatrix}.$$

Since the number of input signals n equals 2K, a $2K \times 2K$ transformation matrix is obtained by substituting the MW matrix filterbank with coefficients values. Each row of the filterbank represents therefore a combination of filters and operates on a respective data stream or, as exemplified herein, modulated optical signal, wherein the matrix filter coefficients of H and G each satisfy an orthogonality condition.

While in the accompanying figures an optical multiplexer resonator 114 is schematically illustrated by a single microring component, this should by no means to be construed as limiting. Correspondingly, one or more optical multiplexer resonators 114 of optical MWT multiplexer medium 110 may for example include a plurality of ring resonators, e.g., in a cascade arrangement (not shown), and/or a Mach-Zehnder interferometer and/or any optical component or components, which may be passive optical components. Realizing an optical multiplexer resonator 114 for example with a plurality of cascaded microrings may facilitate, in comparison to the controlling of the coupling coefficients where only one microring 114 is employed per coefficient, the controlling and/or adjusting of the coupling coefficients according to the system's operating parameters and, therefore, of the coefficients of matrices $H_0$ to $H_3$ and $G_0$ to $G_3$.

The coupling coefficients for the high and low-filter matrix elements H and G may depend on various parameters like, inter alia, the data rate carried by the received optical input signals. A higher data rate may require a smaller radius of microring 114 to retain for example the values of the coefficients in equations (2) and (3). In other words, in order for the orthogonality conditions to be met to enable optical multiwavelet-based OFDM, the parameters of optical multiplexer resonators 114 may be adjustable based on the system's operating parameters (e.g., the data rate). Correspondingly, multiplexer 100 may include, according to some embodiments, a feedback module 140 operatively coupled with one or more or each of optical multiplexer resonators 114 and with an output signal line 120 operative to carry $I_{mux}$ and/or with each output of multiplexer waveguides 112.

Multiplexer feedback module 140 may be configured to cause adjustment of the physical parameters of optical multiplexer resonators 114 based on signal parameters detected at output signal line 120. For example, responsive to an increase in the data rate, multiplexer feedback module 140 may cause adjustment (e.g., reduction) of a radius of one or more of the microrings 114. Adjustment of parameters of multiplexer resonator 114 such as (for example) the radius of a microring can be achieved by local heating by heating element (not shown) (or cooling by cooler element (not shown)) and/or by illumination of resonator 114 by a radiation source (not shown), and/or by evaporation of refractive material onto or from resonator 114 by an evaporator (not shown).

Figure 2:
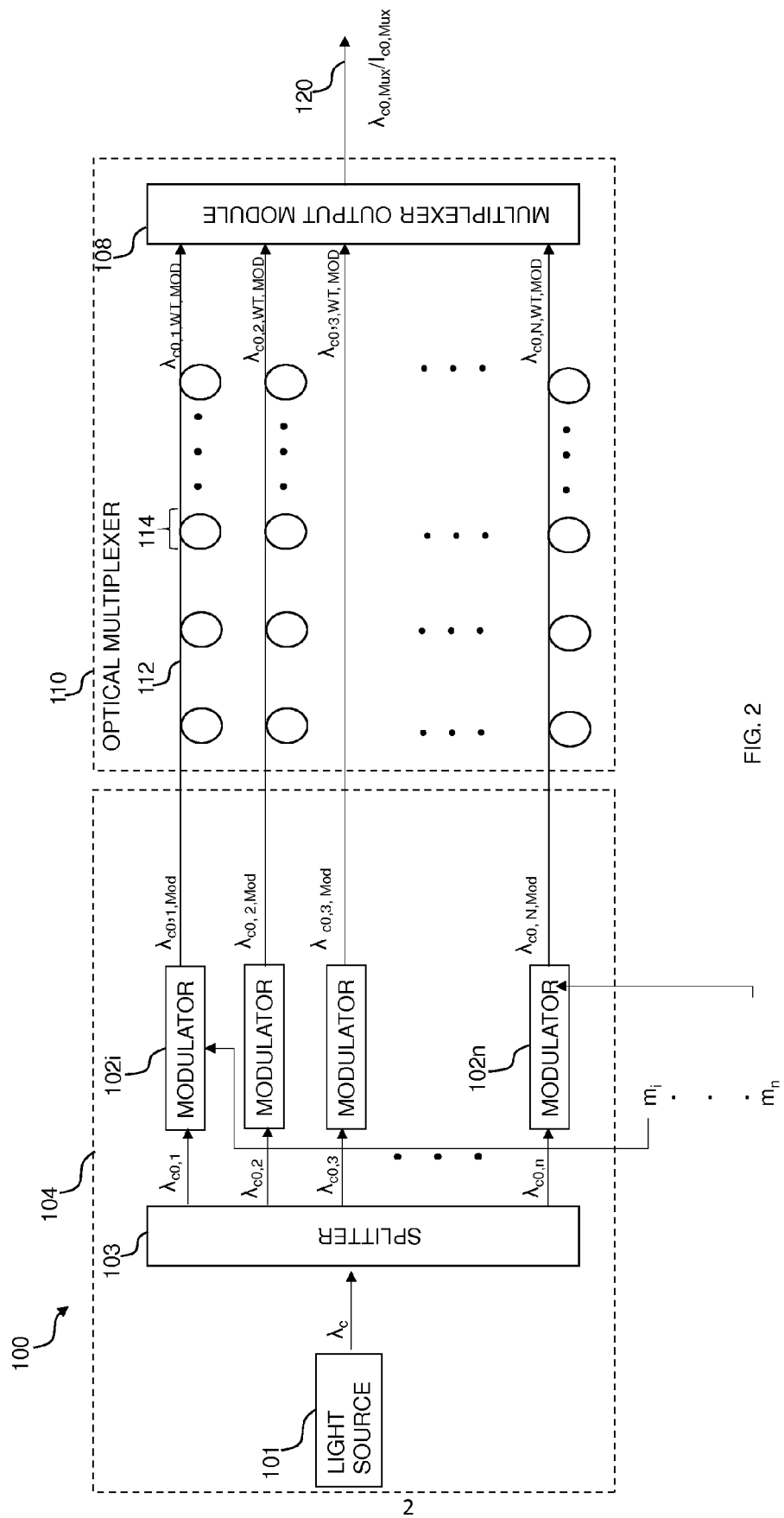
FIG. 2 is a schematic block-diagram illustration of an optical multiwavelet OFDM multiplexer, according to an embodiment.

Referring now to FIG. 2, multiplexer input module 104 of optical wavelet multiplexer 100 may include a splitter 103 for splitting, for example, an optical signal which may qualify as a carrier wave having a wavelength $\lambda_{c0}$ emitted from a light source 101 (e.g., a laser light source) into a plurality of optical signals $\lambda_{c0,1}$ to $\lambda k_{c0,n}$, where $c_0$ denotes the wavelength of the carrier wave. The plurality of optical signals $\lambda_{c0,1}$ to $\lambda_{c0,n}$ may then be modulated through a respective plurality of modulators $102i$-$102n$ by modulating signals $m_i$ to $m_n$, where i=1, 2, . . . n, and n denotes the number of received signals, to obtain modulated optical signals $\lambda_{c0,1,MOD}$-$\lambda_{c0,n,MOD}$. Modulators 102 may in some embodiments also be referred to as "external modulators" 102 for being external to light source 101. Otherwise stated, modulation may be performed after optical carrier waves or signals are emitted by light source 101. In some embodiments, modulator 102 may be an electro-optical modulator. While embodiments disclosed herein refer to external modulators or modulation of optical signals, this should by no means be construed as limiting. Accordingly, internal modulators (not shown) or modulation techniques may be additionally or alternatively be implemented for obtaining the modulated optical carriers.

Modulated optical signals having the same carrier wave $\lambda_{c0,1,MOD}$ to $\lambda_{c0,n,MOD}$ are subjected to multiwavelet transform and filtering by a MW matrix filterbank (e.g., GHM matrix filterbank) implemented by optical MWT multiplexer medium 110. After the modulated optical signals are subjected to multiwavelet transform and filtering by optical MWT multiplexer medium 110, the resulting wavelet-processed optical signals $\lambda_{c0,1,WT,MOD}$ to $\lambda_{c0,n,WT,MOD}$ are multiplexed or combined into a multiplexed optical output signal $\lambda_{c0,MUX}$. The multiplexing is performed by combining the wavelet-transformed optical signals by multiplexing output module 108 of optical wavelet multiplexer 100. Alternatively, output module 108 may include a plurality of detectors (not shown) configured to detect the optical signals $\lambda_{c0,n,WT,MOD}$ to $\lambda_{c0,n,WT,MOD}$ emitted from multiplexer waveguides 112 and to convert the detected light into respective electrical signals, which may then be multiplexed into multiplexed signal $I_{c0,mux}$.

Figure 3:
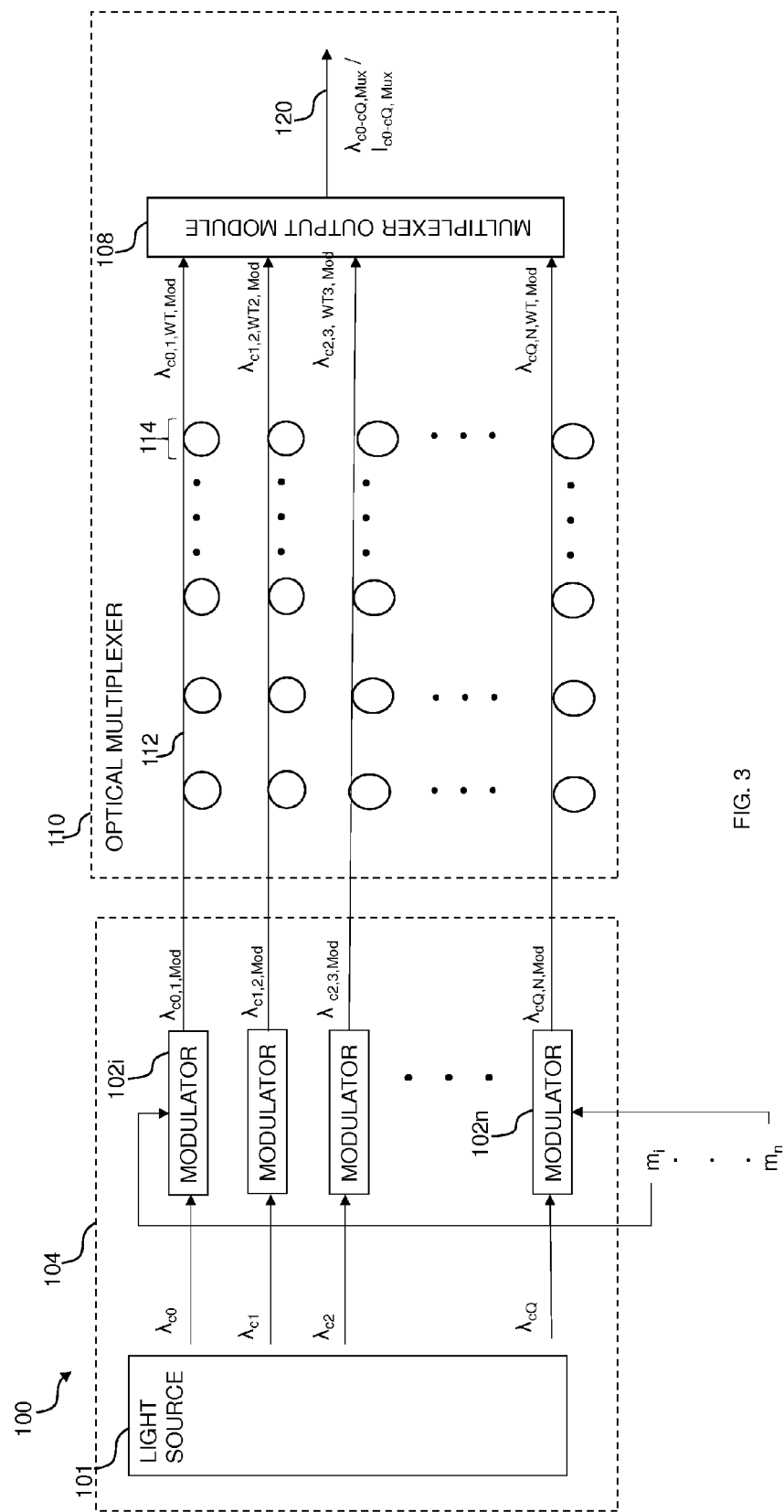
FIG. 3 is a schematic block-diagram illustration of an optical multiwavelet OFDM multiplexer, according to another embodiment.

Reference is now made to FIG. 3. According to some embodiments, one or more light sources 101 may emit a plurality of optical signals that may qualify as carrier waves. At least two (e.g., a first and a second optical signal) of the plurality of optical signals may have a first and a second wavelength, respectively. Such optical signals are denoted herein as $\lambda_{c0}$ to $\lambda_{cQ}$, where the different subscript $c_0$ to $c_Q$ denotes the optionally different wavelengths Q=1, . . . , n.

The plurality of optical signals $\lambda_{c0}$ to $\lambda L_{cQ}$ may be modulated through modulators $102i$ to $102n$ where i=1, 2, . . . , n, by modulating signals $m_i$ to $m_n$, where n denotes the number of received signals, to obtain modulated optical signals $\lambda_{c0,1,Mod}$ to $\lambda_{cQ,n,Mod}$. The modulated optical signals having at least two different wavelengths are then subjected to multiwavelet transformation according to the MW matrix filterbank implemented by optical wavelet multiplexer 100 for obtaining multiwavelet transformed optical signals $\lambda_{c0,1,WT,MOD}$ to $\lambda_{cQ,n,WT,MOD}$. Obtained signals $\lambda_{c0,1,WT,MOD}$ to $\lambda_{cQ,n,WT,MOD}$ are then multiplexed or combined into a multiplexed output signal $\lambda_{c0-cQ,MUX}$. The multiplexing is performed by combining the wavelet-processed optical signals $\lambda_{c0,1,WT,MOD}$ to $\lambda_{cQ,n,WT,MOD}$ in multiplexer output module 108 of optical wavelet multiplexer 100.

According to some embodiments, multiplexer output module 108 may include an output coupler that is communicatively coupled with an optical fiber (not shown). Alternatively, multiplexer output module 108 may include a plurality of detectors (not shown) configured to detect light emitted from multiplexer waveguides 112 and to generate electrical signals representative of the detected light. The electrical signals representative of the wavelet-processed optical signals may then be multiplexed by multiplexer output module 108 into a multiplexed signal $I_{mux}$ for further transmission and/or processing.

Figure 4:
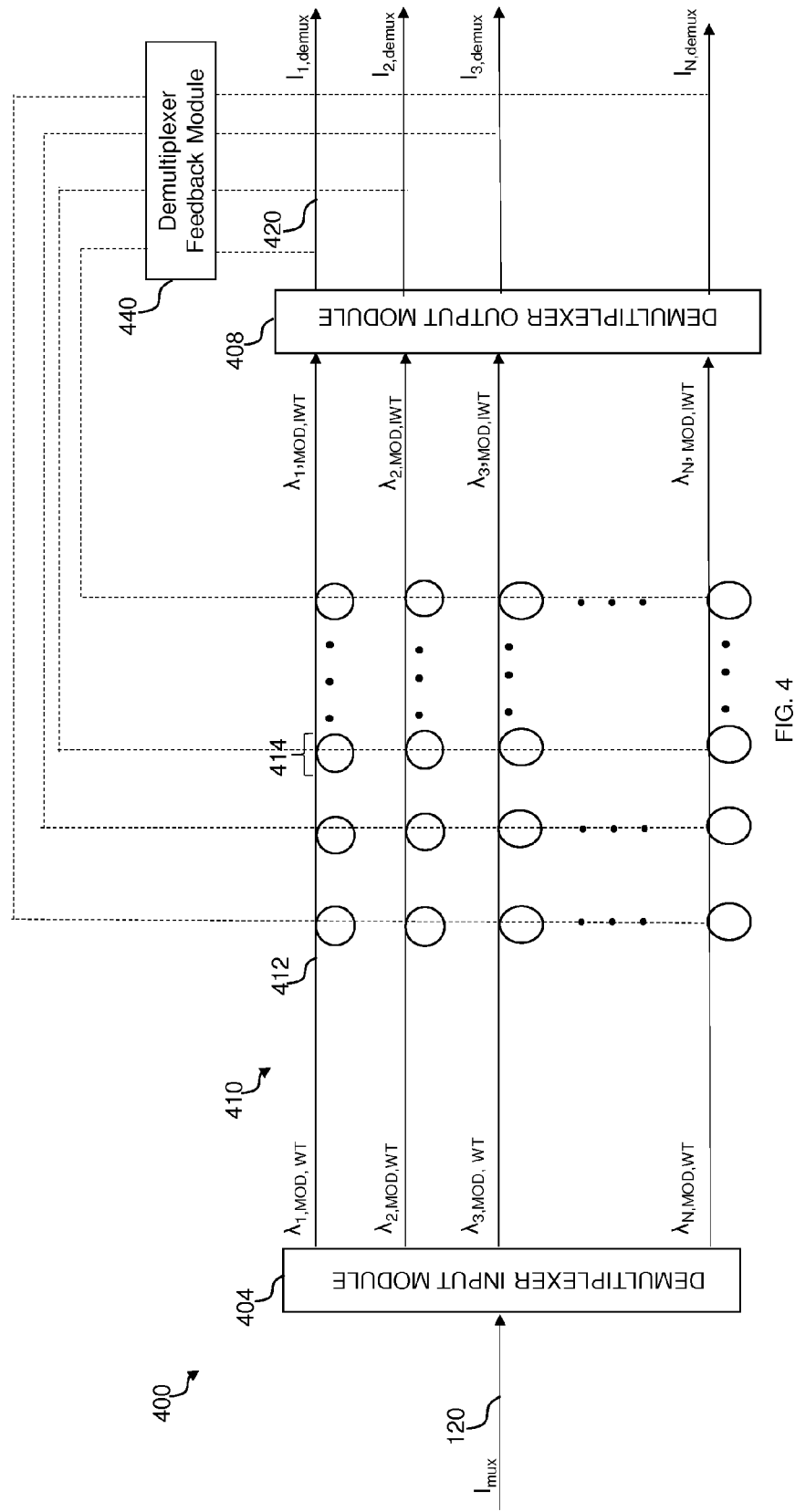
FIG. 4 is a schematic general block-diagram illustration of an optical multiwavelet OFDM demultiplexer, according to an embodiment.

Reference is now made to FIG. 4. Aspects of embodiments relate to an optical multiwavelet demultiplexer 400 that is configured, for example, to demultiplex signals that were multiplexed by an optical wavelet multiplexer disclosed 100 herein. Optical wavelet demultiplexer 400 includes an optical MWT demultiplexer or reconstruction medium 410 and may further include a demultiplexer input module 404 for providing optical MWT demultiplexer medium 410, in parallel, with a plurality of separated wavelet-transformed signals $\lambda_{1,WT}$-$\lambda_{n,WT}$ respectively associated with multiplexed source signals $I_{1,source}$-$I_{n,source}$ which may be electrical or optical signals. Demultiplexer input module 404 may, for example, include a splitter. Optical MWT demultiplexer medium 410 comprises a plurality of demultiplexer waveguides 412 that are communicatively coupled in parallel with demux input module 404. The number of demultiplexer waveguides 412 corresponds to the number of input signals. For example, a pair of demultiplexer waveguides 412 may be configured to wavelet-process an input signal. More specifically, and in inverse analogy to optical wavelet multiplexer 100 described herein, incoming wavelet-transformed signals $\lambda_{1,WT}$-$\lambda_{n,WT}$ may undergo (as opposed to the multiplexing disclosed hereinabove) parallel-to-serial conversion and inverse wavelet-transformation by optical demultiplexer resonators 414 to obtain inverse wavelet-transformed signals $\lambda_{1,IWT}$-$\lambda_{n,IWT}$ according to an IMW matrix filterbank implementation. The IMW matrix filterbank may be implemented by a GHM matrix filterbank. Correspondingly, the number of optical demultiplexer resonators 414 of optical MWT demultiplexer medium 410 may be $n^2$, where n is the number of sets of parallel optical wavelet-processed input signals. Again, merely to simplify the discussion that follows, K may equal 2, i.e., the individual filters of the MW matrix filterbank are implemented by 2×2 matrices. In analogy to what is described herein with optical multiplexer resonators 114, optical demultiplexer resonators 414 of optical MWT demultiplexer medium 410 may for example include a plurality of microring resonators 414 in a cascade arrangement (not shown) and/or a Mach-Zehnder interferometer and/or any optical component or components, which may be passive optical components As exemplified hereinbelow in greater detail, the inverse wavelet-transformed signals $\lambda_{1,IWT}$-$\lambda_{n,IWT}$ may in some embodiments be further processed by a demultiplexer output module 408. Demultiplexer output module 408 may be configured to demodulate inverse wavelet-transformed signals $\lambda_{1,IWT}$-$\lambda_{n,IWT}$, to convert inverse wavelet-transformed and optical signals $\lambda_{1,IWT,demux}$-$\lambda_{n,IWT,demux}$ into electrical signals and/or configured to filter out one or more carrier wavelengths $\lambda_{c0}$-$\lambda_{cQ}$.

Correspondingly, demultiplexer output module 408 may include demodulators (not shown) for recreating source signals or demultiplexed signals $I_{1,source}$-$I_{n,source}$. It should be noted that in some embodiments, the demodulators (not shown) may be configured to demodulate the modulated and inverse wavelet-transformed optical signals $\lambda_{1,IWT}$-$\lambda_{n,IWT}$. In alternative embodiments, the demodulators (not shown) may be configured to demodulate electrical signals representative of the modulated and inverse wavelet-transformed optical signals $\lambda_{1,IWT}$-$\lambda_{n,IWT}$.

A demultiplexer feedback module 440 may be operatively coupled with one or more or each one of optical demultiplexer resonators 414 and output signal lines 420 operative to carry $I_{1,demux}$-$I_{N,demux}$, and/or with each output of demultiplexer waveguides 412. Demultiplexer feedback module 440 may for example be configured to cause adjustment of the physical parameters of optical demultiplexer resonators 414 based on the detected signal parameters at demultiplexer output signal lines 420.

Figure 5:
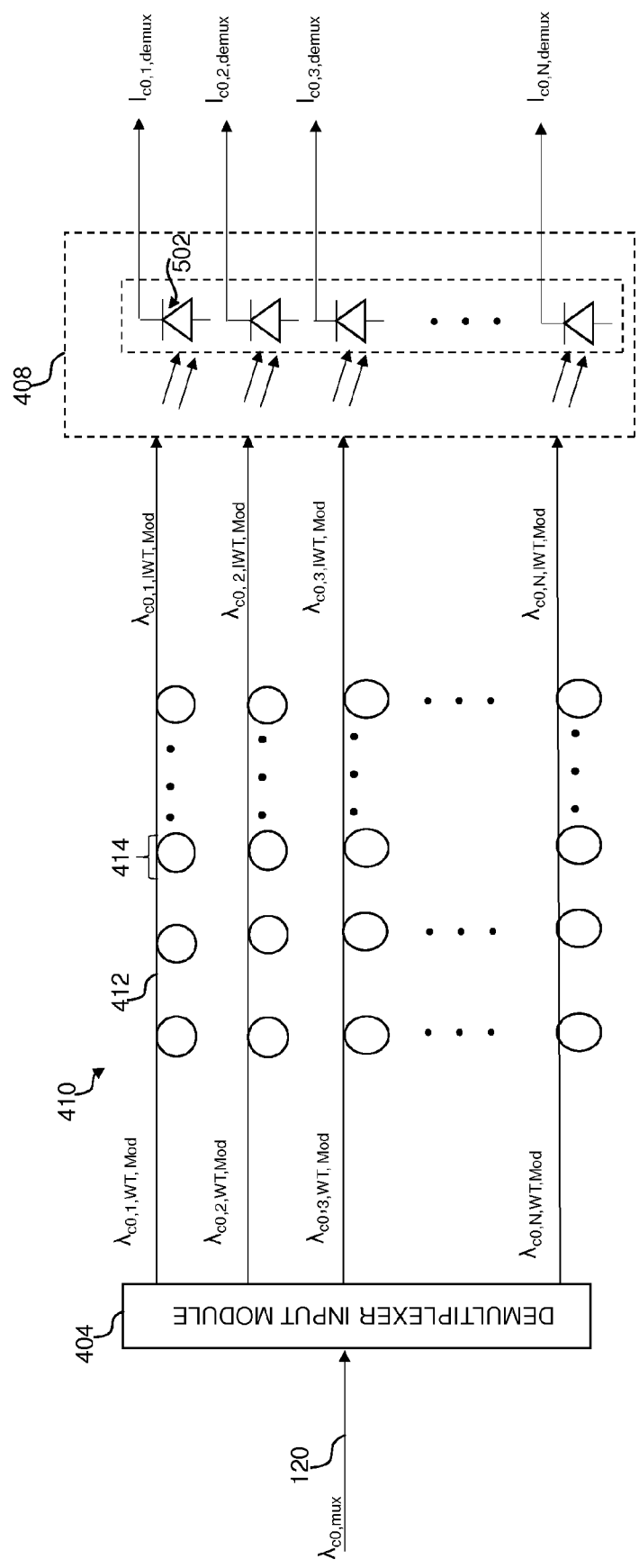
FIG. 5 is a schematic block-diagram illustration of an optical multiwavelet OFDM demultiplexer of wavelet-based OFDM signals, according to an embodiment.

Further reference is made to FIG. 5. Demultiplexed optical signals $\lambda_{c0,1,IWT,Mod}$ to $\lambda_{c0,n,IWT,Mod}$ having a substantially single carrier frequency $c_0$ may in some embodiments be converted into electrical signals $I_{c0,1,demux}$-$I_{c0,n,demux}$, by optical-to-electrical converters 502 of demultiplexer output module 408.

Figure 6:
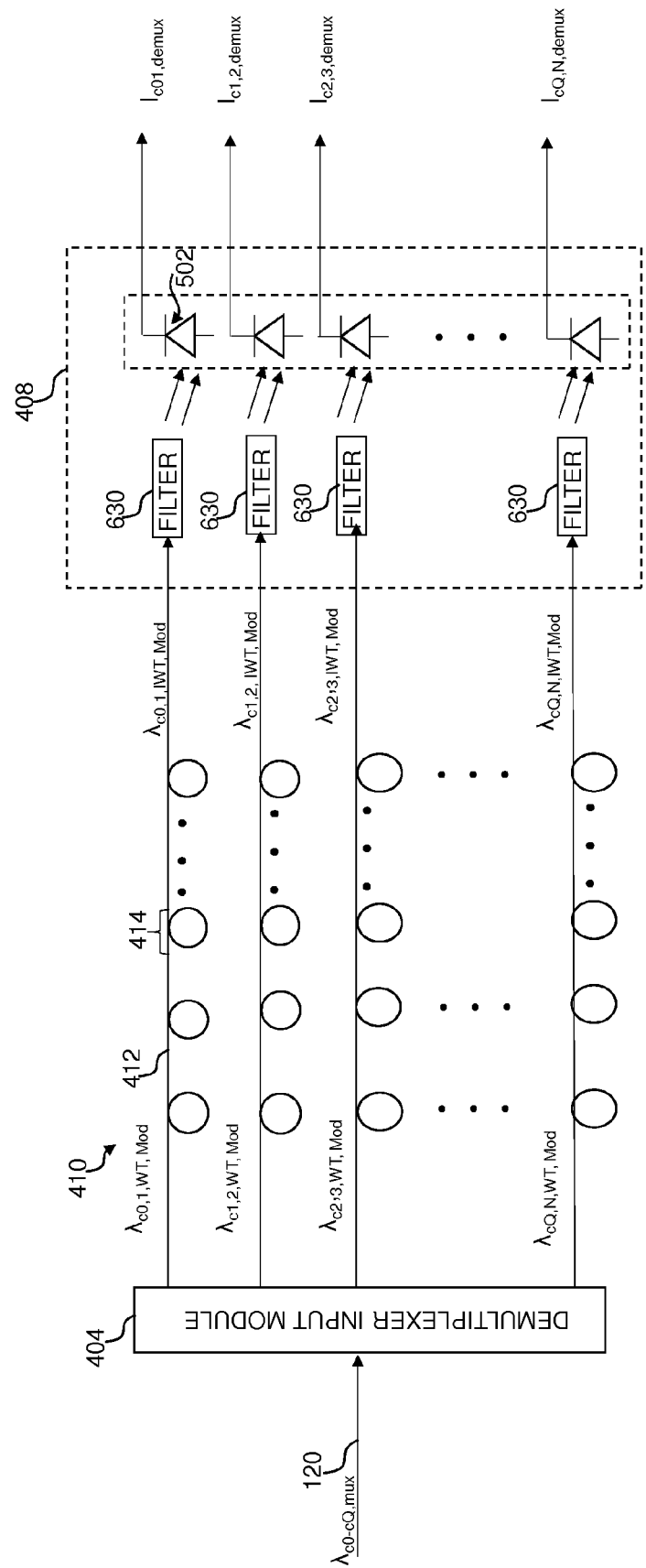
FIG. 6 is a schematic block-diagram illustration of an optical multiwavelet OFDM demultiplexer, according to another embodiment.

Referring now to FIG. 6, inverse wavelet-transformed optical signals may in some implementations have at least two different carrier wavelengths. Such optical signals are herein denoted as $\lambda_{c0,IWT,Mod}$-$\lambda_{cQ,n,IWT,Mod}$, where subscript $c_0$-$c_Q$ denotes different carrier wavelengths of the optical signals. In this case, the carrier wavelengths respective of the input signals $\lambda_{c0,WT1,Mod}$-$\lambda_{cQ,WTn,Mod}$ may be filtered out by optical filters 630 of demultiplexer output module 408. The filtered inverse wavelet-transformed optical signals may then be further processed to recreate the source signals $I_{c0,1,demux}$-$I_{c1,n,demux}$. Such further processing may include, for example, demodulation and optical-to-electrical conversion.

Figure 7:
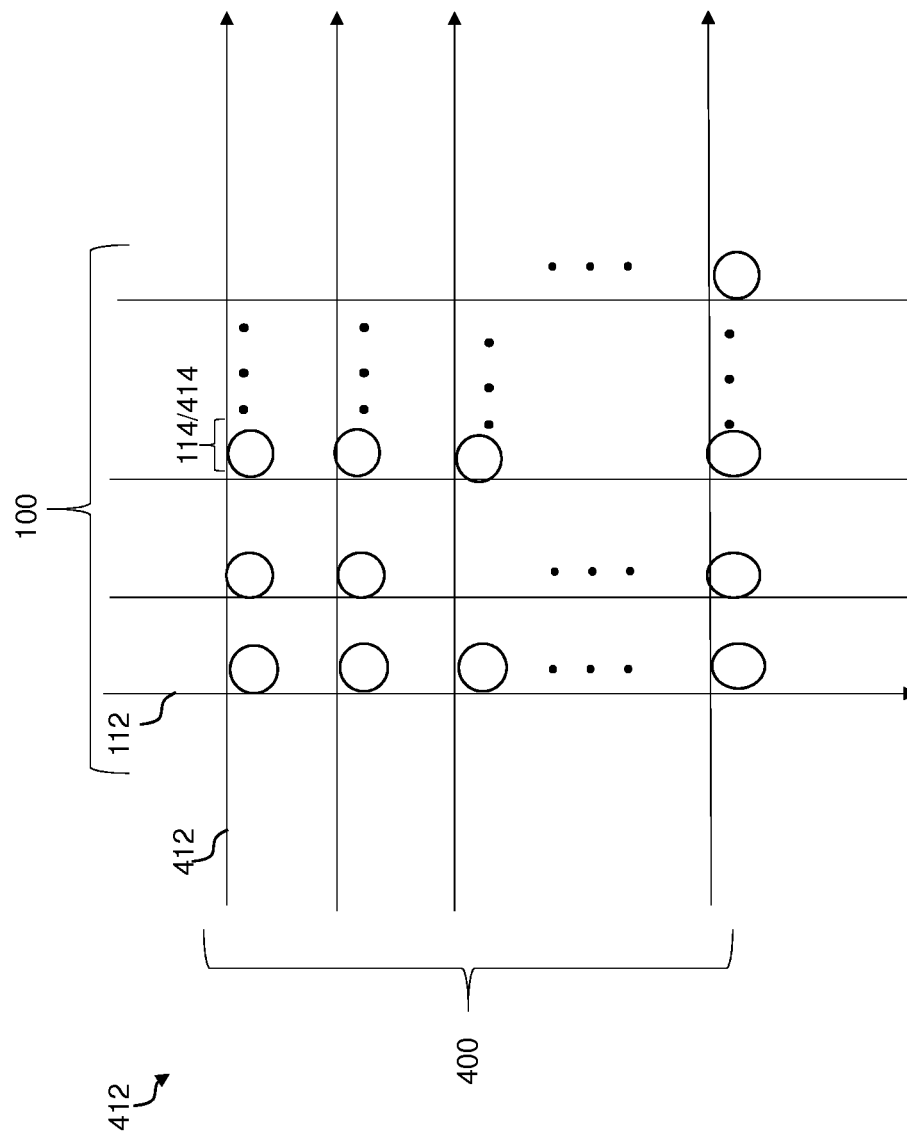
FIG. 7 is a schematic block-diagram illustration of an optical multiwavelet multiplexer and demultiplexer system, according to an embodiment.

Further reference is now made to FIG. 7. According to embodiments, a system 700 includes optical wavelet multiplexer 100 coupled with optical multiwavelet demultiplexer 400 to transmit, via a network (not shown), signals encoding data representative of information from optical wavelet multiplexer 100 to optical multiwavelet demultiplexer 400. In some embodiments, optical wavelet multiplexer 100 may share resources and/or elements of optical demultiplexer 400. For example, in order to recreate the source signals, the base functions of the wavelet transform have to be identical to the base functions of the inverse wavelet transform. Hence, the resonators of optical MWT multiplexer medium 110 and optical MWT demultiplexer medium 410 are of identical design. Thus, optical multiplexer resonators 114 may also be employed to implement optical demultiplexer resonators 414, yet with respective different inputs and outputs for multiplexed and demultiplexed optical signals. More specifically, an input of for example optical multiplexer resonator 114 may be the output of optical demultiplexer resonator 414. Thus, depending on the direction of propagation of multiwavelet-processed OFDM encoded optical signals, an optical multiwavelet multiplexer may, at the same time, also function as an optical multiwavelet demultiplexer.

Figure 8:
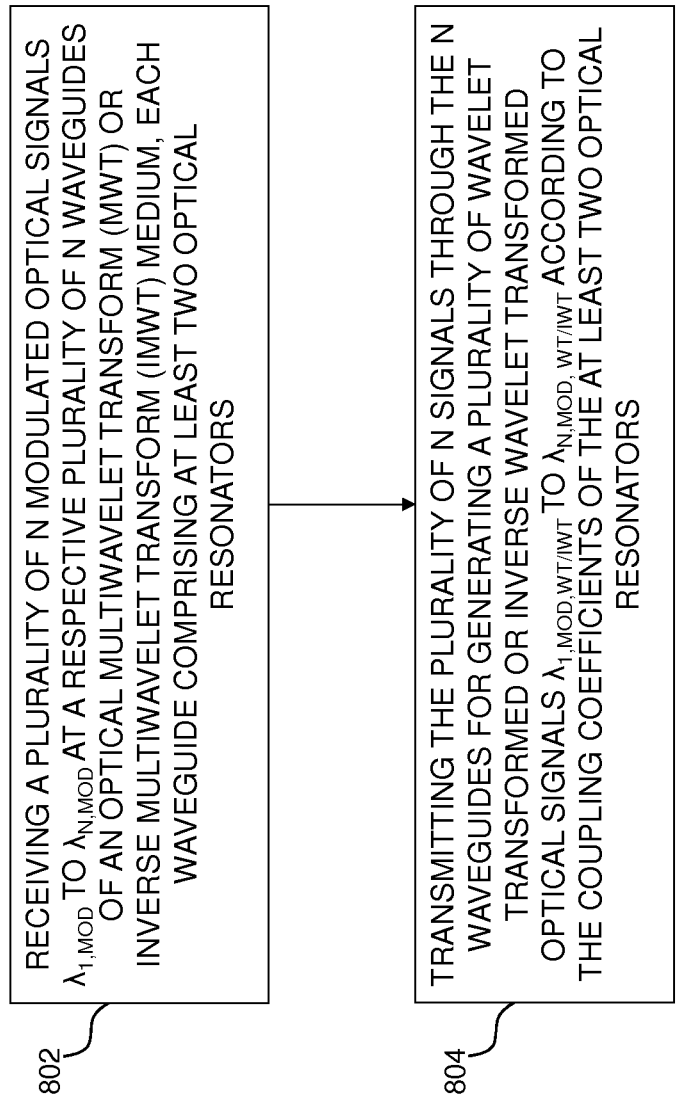
FIG. 8 is a flow-chart illustration of a method for implementing optical multiwavelet-based demultiplexing of multiwavelet-based OFDM signals.

Reference is now made to FIG. 8. According to some embodiments, a method for optical multiwavelet OFD Multiplexing and/or Demultiplexing includes, as indicated by procedure 802, receiving (e.g., at multiplexer input module 104 or demultiplexer output module 408) a plurality of N modulated optical signals $\lambda_{1,MOD}$ to $\lambda_{n,MOD}$ at a respective plurality of N waveguides (e.g., multiplexer waveguides 112 or demultiplexer waveguides 412) of an optical multiwavelet transform (MWT) or inverse multiwavelet transform (IMWT) medium, each waveguide comprising at least two optical resonators.

As indicated by box 804, the method may include transmitting the plurality of N signals through the N waveguides for generating a plurality of wavelet transformed or inverse wavelet transformed optical signals $\lambda_{1,MOD,WT/IWT}$ to $\lambda_{N,MOD,WT/IWT}$ according to the coupling coefficients of the at least two optical resonators.

In the claims or specification of the present application, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

It should be understood that where the claims or specification refer to "a" or an element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications and other applications of such embodiments may be made. The disclosure is to be understood as not limited by the specific embodiments described herein, but only by the scope of the appended claims.

What is claimed is:

1. An optical multiwavelet transform (MWT) or inverse multiwavelet transform (IMWT) medium for implementing optical wavelet transform (WT) Orthogonal Frequency Division Multiplexing (OFDM) or optical demultiplexing, the optical MWT/IMWT medium comprising:
    a plurality of N waveguides for receiving in parallel a corresponding number of N modulated optical input signals $\lambda_{1,MOD}$ to $\lambda_{N,MOD}$, each waveguide comprising at least two optical resonators configured such as to realize a wavelet filterbank that effects a wavelet transformation or inverse wavelet transformation on modulated optical signals to obtain respective optical WT or IWT signals that are respectively orthogonally frequency division multiplexed or demultiplexed, wherein an optical resonator of the at least two optical resonators comprises a microring resonator.

2. The optical MWT medium of claim 1, wherein an optical resonator of the at least two optical resonators comprises a Mach-Zehnder interferometer.

3. The optical MWT medium of claim 1, wherein an optical resonator of the at least two optical resonators comprises a plurality of microring resonators in cascade arrangement.

4. The optical MWT medium of claim 1, wherein the wavelet filterbank is a Geronimo, Hardian and Massopust (GHM) wavelet filterbank.

5. The optical MWT medium of claim 2, wherein the wavelet filterbank is a Geronimo, Hardian and Massopust (GHM) wavelet filterbank.

6. The optical MWT medium of claim 3, wherein the wavelet filterbank is a Geronimo, Hardian and Massopust (GHM) wavelet filterbank.

7. An optical wavelet multiplexer comprising:
    a) a multiplexer input module comprising a plurality of N modulators for modulating N optical input signals to obtain a plurality of N modulated optical input signals $\lambda_{1,MOD}$-$\lambda_{N,MOD}$; and
    b) an optical multiwavelet transform (MWT) medium for receiving the N modulated optical input signals $\lambda_{1,MOD}$-$\lambda_{N,MOD}$, the optical MWT medium comprising a plurality of N waveguides for receiving in parallel the N modulated optical input signals $\lambda_{1,MOD}$ to $\lambda_{N,MOD}$, each waveguide comprising at least two optical resonators configured such to realize a wavelet filterbank that effects a wavelet transformation on modulated optical signals to obtain optical WT signals that are orthogonally frequency division multiplexed.

8. The optical wavelet multiplexer of claim 7, wherein the multiplexer input module further comprises a light source.

9. The optical wavelet multiplexer of claim 8, wherein the multiplexer input module comprises a splitter for splitting optical signals emitted by the light source.

10. The optical wavelet multiplexer of claim 7, further comprising a multiplexer feedback module configured to cause adjustment of the physical parameters of the at least two optical multiplexer resonators based on detected signal parameters at an output signal line.

11. The optical wavelet multiplexer of claim 8, further comprising a multiplexer feedback module configured to cause adjustment of the physical parameters of the at least two optical multiplexer resonators based on detected signal parameters at an output signal line.

12. The optical wavelet multiplexer of claim 9, further comprising a multiplexer feedback module configured to cause adjustment of the physical parameters of the at least two optical multiplexer resonators based on detected signal parameters at an output signal line.

13. The optical wavelet multiplexer of claim 7, wherein an optical resonator of the at least two optical resonators comprises a resonator selected from the group consisting of a microring resonator, a Mach-Zehnder interferometer and a plurality of microring resonators in cascade arrangement.

14. The optical wavelet multiplexer of claim 7, wherein the wavelet filterbank is a Geronimo, Hardian and Massopust (GHM) wavelet filterbank.

15. An optical wavelet demultiplexer, comprising:
   a) an optical inverse multiwavelet transform (IMWT) medium comprising a plurality of N waveguides for receiving in parallel corresponding N modulated optical wavelet transformed (WT) input signals $\lambda_{1,MOD,WT}$ to $\lambda_{N,MOD,WT}$ of an optical OFDM signal, each waveguide comprising at least two optical resonators configured such to realize a wavelet filterbank that effects inverse wavelet transformation (IWT) on the modulated optical wavelet transformed signals to obtain optical IWT signals $\lambda_{1,MOD,IWT}$ to $\lambda_{N,MOD,IWT}$, wherein optical WT signals $\lambda_{1,MOD,WT}$ to $\lambda_{N,MOD,WT}$ and optical IWT signals $\lambda_{1,MOD,IWT}$ to $\lambda_{N,MOD,IWT}$ are orthogonally frequency division demultiplexed; and
   b) a demultiplexer input module for providing the optical IMWT medium with the plurality of N modulated and optical WT signals $\lambda_{1,MOD,WT}$ to $\lambda_{N,MOD,WT}$ of a multiplexed signal $I_{mux}$.

16. The optical wavelet demultiplexer of claim 15, further comprising:
   c) a demultiplexer output module for providing demultiplexed signals $I_{1,demux}$ to $I_{N,demux}$ over output signal lines; and
   d) a demultiplexer feedback module that is operatively coupled with at least one of the at least two optical demultiplexer resonators and with the output signal lines and/or with each output of waveguides.

17. The optical wavelet demultiplexer of claim 16, wherein the demultiplexer output module further comprises N optical filters for obtaining optical inverse wavelet transformed signals $\lambda_{c0,1,MOD,IWT}$ to $\lambda_{cQ,N,MOD,IWT}$ respective of their carrier wavelengths c0 to cQ.

18. The optical wavelet multiplexer of claim 15, wherein an optical resonator of the at least two optical resonators comprises a resonator selected from the group consisting of a microring resonator, a Mach-Zehnder interferometer and a plurality of microring resonators in cascade arrangement.

\* \* \* \* \*